H. J. FERRIS.
STANCHION.
APPLICATION FILED FEB. 12, 1914.
1,122,711. Patented Dec. 29, 1914.
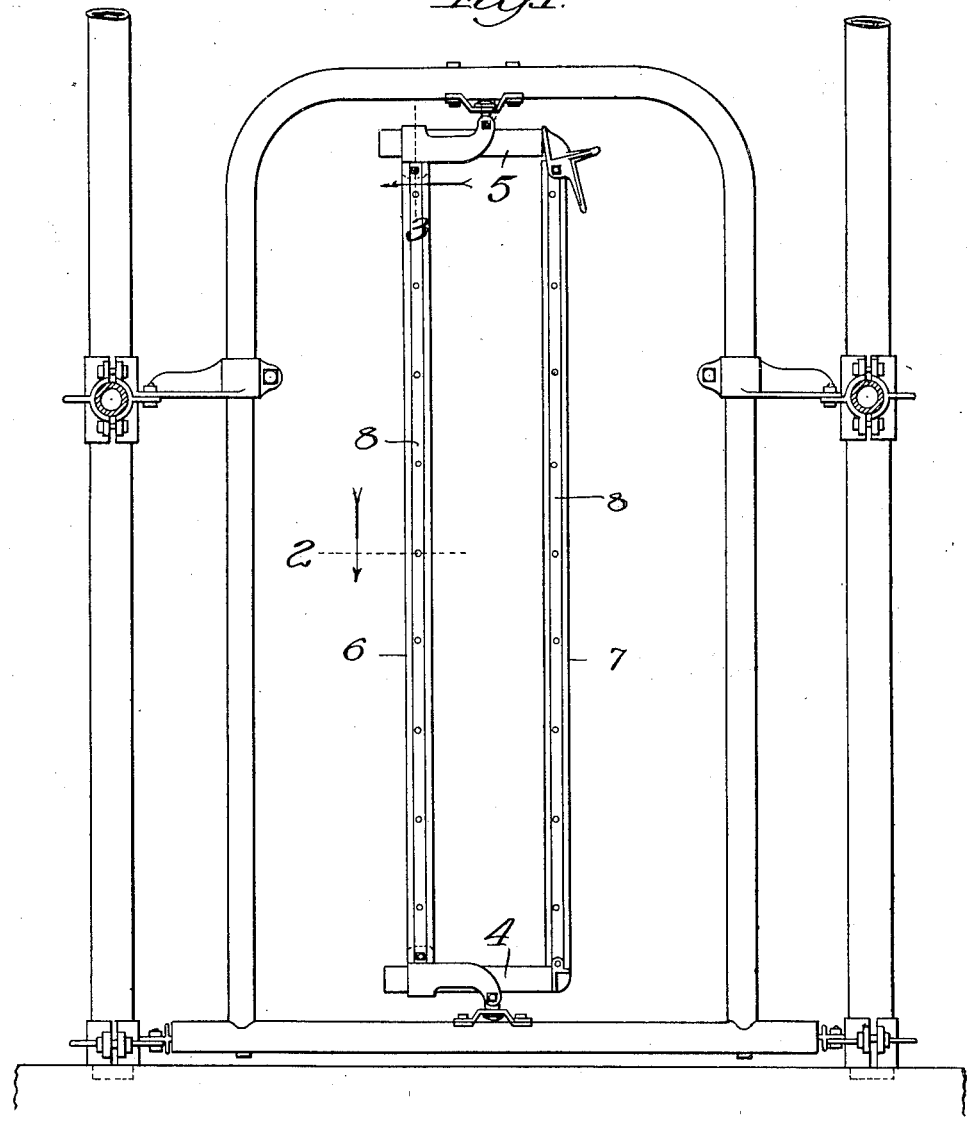
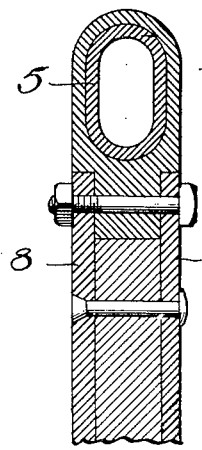
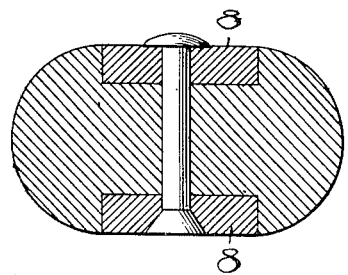
Witnesses:
Inventor:
Howard J. Ferris,

UNITED STATES PATENT OFFICE.

HOWARD J. FERRIS, OF HARVARD, ILLINOIS, ASSIGNOR TO HUNT, HELM, FERRIS & COMPANY, OF HARVARD, ILLINOIS, A CORPORATION OF ILLINOIS.

STANCHION.

1,122,711.   Specification of Letters Patent.   Patented Dec. 29, 1914.

Application filed February 12, 1914.  Serial No. 818,191.

*To all whom it may concern:*

Be it known that I, HOWARD J. FERRIS, a citizen of the United States, residing at Harvard, in the county of McHenry and State of Illinois, have invented a new and useful Improvement in Stanchions, of which the following is a specification.

My invention relates to certain new and useful improvements in stanchions and is fully described and explained in the specification and shown in the accompanying drawings, in which:—

Figure 1 is an elevation of the front of a stall, showing my improved stanchion in place therein; Fig. 2 is a section on the line 2 of Fig. 1, and Fig. 3 is a section on the line 3 of Fig. 1.

Referring to the drawings, 4 and 5 are the lower and upper members of the stanchion, the same being pivotally supported in any ordinary manner, it being understood that any stanchion-supporting mechanism may be used for this purpose.

6 and 7 are the vertical members of the stanchion which, in practice, embrace between them the neck of the animal confined thereby. Each of these bars is of wood and they are provided with edges suitably curved or smoothed off to produce the desired results, without irritating the animal. Each of these wooden side-bars is provided with two opposite channels cut in its opposite faces in which are set metal plates 8 secured in place by rivets passed through the bar. These plates serve not only to reinforce and greatly to strengthen the wooden bars, but they afford means for the ready attachment of the end members of the stanchion. For instance, as shown in Fig. 3, the metal plates extend above the wood, so that they receive between them the corresponding part of the upper member of the stanchion.

By the construction adopted each side-bar presents a wooden face to the neck of the animal, and thus the present structure secures all the advantages inherent in a wooden or wood faced structure. The device, however, is far superior to any wooden stanchion, or stanchions, with wooden side-bars, for a number of reasons. There is a very heavy strain on the side-bars of the stanchion when the animal confined is reaching for food in the manger. The animal frequently pushes with its full strength against the stanchion and the side-bars thereof receive extreme pressure. The slightest defect in the wood side-bar results in breakage, and it is almost impossible to be certain that any given side-bar has not some cross-grained place where the stanchion may snap off. Furthermore, the strain at the pivot of the swinging side is peculiarly high, and with wood side bars the pivot-hole wears rapidly. Of course, at the pivot point of the stanchion, the wood bar has only half the strength which it has throughout the rest of its length, and breaks at this pivot are very frequent, and even when they do not occur, the stanchion rapidly wears loose.

Many of the foregoing objections apply equally to common forms of metal side-bars, wood lined. The strain frequently breaks off wood producing most undesirable results. The stanchion here shown with its composite side-bar is free from all these objections, the wood is so strengthened as to be satisfactory in any event, and because of the metal reinforcement it can be made of smaller cross-section than a standard wood bar. It is particularly important, however, that the pivot point, and the other points of union with the ends of the stanchion be reinforced and in the present structure the bolts or rivets which unite the side-bars to the ends of the stanchion, and the locking latch at the upper end of the swinging side-bar pass through the metal-reinforcing plates so that the strength of the wood is in no way relied upon at the joints.

I realize that considerable variation is possible in the details of the construction herein shown, and I do not intend to limit myself thereto, except as pointed out in the following claims, in which it is my intention to claim all the novelty inherent in the device as broadly as the prior state of the art will permit.

I claim as new and desire to secure by Letters Patent:—

1. A stanchion having its side-bars formed of wood, of elongated form in cross-section and having front and rear faces, and each having its faces channeled out with metal bars set in the channels thus formed to lie flush with the wood face, and fastening means between the side-bars and end members extending through said metal bars and wooden side-bars to secure the former in place for the purpose set forth.

2. A stanchion having composite side-bars each formed of wood of elongated form in cross-section and having front and rear faces with its edge toward the stanchion-opening, each bar having metal plates let into and set in flush with its two faces, and fastening means extending through said metal plates and the side-bars to secure the former in place.

3. A stanchion comprising metal top and bottom members, and a stationary and a swinging side-member extending between the end-members, each side-member being formed of wood and having applied to its front and rear faces metal plates of less width than the wood bars, and fastening means between the side-bars and end-members passing through said metal plates.

In testimony whereof I have hereunto set my hand this 9th day of January, 1914.

HOWARD J. FERRIS.

In presence of two subscribing witnesses:
L. HEISLAR,
A. J. FLOYD.